United States Patent
Lashkarian et al.

(10) Patent No.: US 7,006,800 B1
(45) Date of Patent: Feb. 28, 2006

(54) SIGNAL-TO-NOISE RATIO (SNR) ESTIMATOR IN WIRELESS FADING CHANNELS

(75) Inventors: Navid Lashkarian, Pleasanton, CA (US); Karim Nassiri-Toussi, Belmont, CA (US)

(73) Assignee: National Semiconductor Corporation, Santa Clara, CA (US)

( * ) Notice: Subject to any disclaimer, the term of this patent is extended or adjusted under 35 U.S.C. 154(b) by 433 days.

(21) Appl. No.: 10/457,057

(22) Filed: Jun. 5, 2003

(51) Int. Cl.
*H04B 17/00* (2006.01)

(52) U.S. Cl. ............... 455/67.11; 455/63.1; 455/214; 375/350; 375/343

(58) Field of Classification Search ............ 455/226.1, 455/67.11, 67.13, 214, 63.1, 307; 375/340, 375/341, 432, 343, 350
See application file for complete search history.

(56) References Cited

U.S. PATENT DOCUMENTS

| | | | |
|---|---|---|---|
| 4,492,923 A * | 1/1985 | Byram | 324/207.26 |
| 5,131,011 A * | 7/1992 | Bergmans et al. | 375/341 |
| 5,202,903 A * | 4/1993 | Okanoue | 375/341 |
| 6,044,083 A * | 3/2000 | Citta et al. | 375/342 |
| 6,122,309 A * | 9/2000 | Bergstrom et al. | 375/350 |
| 6,307,888 B1 * | 10/2001 | Le Clerc | 375/340 |
| 6,397,083 B1 * | 5/2002 | Martin et al. | 455/67.11 |
| 6,477,214 B1 * | 11/2002 | Fowler et al. | 455/307 |
| 2004/0028155 A1 * | 2/2004 | Dornstetter et al. | 375/343 |

* cited by examiner

*Primary Examiner*—Lana Le
(74) *Attorney, Agent, or Firm*—Merchant & Gould P.C.; Mark R. Hennings

(57) ABSTRACT

A signal-to-noise estimator is provided for estimating the signal-to-noise ratio in wireless fading channels. The estimator can be applied to likelihood ratio estimation of turbo decoders in third generation wide-band code division multiple access (WCDMA) systems. Time-multiplexed samples of pilot symbols from a wireless receiver are supplied to the estimator to obtain individual estimates of signal power and/or noise power. The estimator uses a de-correlating filter in which the coefficients are known functions (such as eigen-vectors) of the auto-correlation matrix for a wireless channel. The decorrelating filter is used by the estimator to map an observation vector into a set of statistically independent samples. The energy of each vector component is computed individually and combined to produce an aggregate sum for the vector. The aggregate sum can be subtracted from the pilot tone power in order to produce an estimate of noise power.

20 Claims, 3 Drawing Sheets

SIGNAL-TO-NOISE RATIO (SNR) ESTIMATOR IN WIRELESS FADING CHANNELS

FIELD OF THE INVENTION

The present invention relates generally to wide-band code division multiple access (WCDMA) systems, and more particularly to turbo decoding likelihood ratio estimation in WCDMA systems.

BACKGROUND OF THE INVENTION

The generation and transmission of signals invariably involves the introduction of noise into signals, which degrades the quality of the signals and may prevent accurate decoding of the signals. A determination (or an accurate estimate) of the noise contained in the system is useful for enhancing the signal-to-noise ratio of a received signal. Wide-band code division multiple access (WCDMA) systems, such as base stations and mobile terminals, employ a turbo decoder, which uses signal noise power values to enhance accurate decoding of the degraded signals that the WCDMA systems receive. Furthermore, WCDMA systems control power transmission by measuring the received Signal-to-Noise power Ratio (SNR). Accordingly, an accurate estimate of SNR improves the power control and subsequently increases the system performance and capacity.

An appreciation of the present invention and its improvements can be obtained by reference to the accompanying drawings, which are briefly summarized below, to the following detailed description of illustrated embodiments of the invention, and to the appended claims.

DETAILED DESCRIPTION OF THE PREFERRED EMBODIMENT

Figure 1:
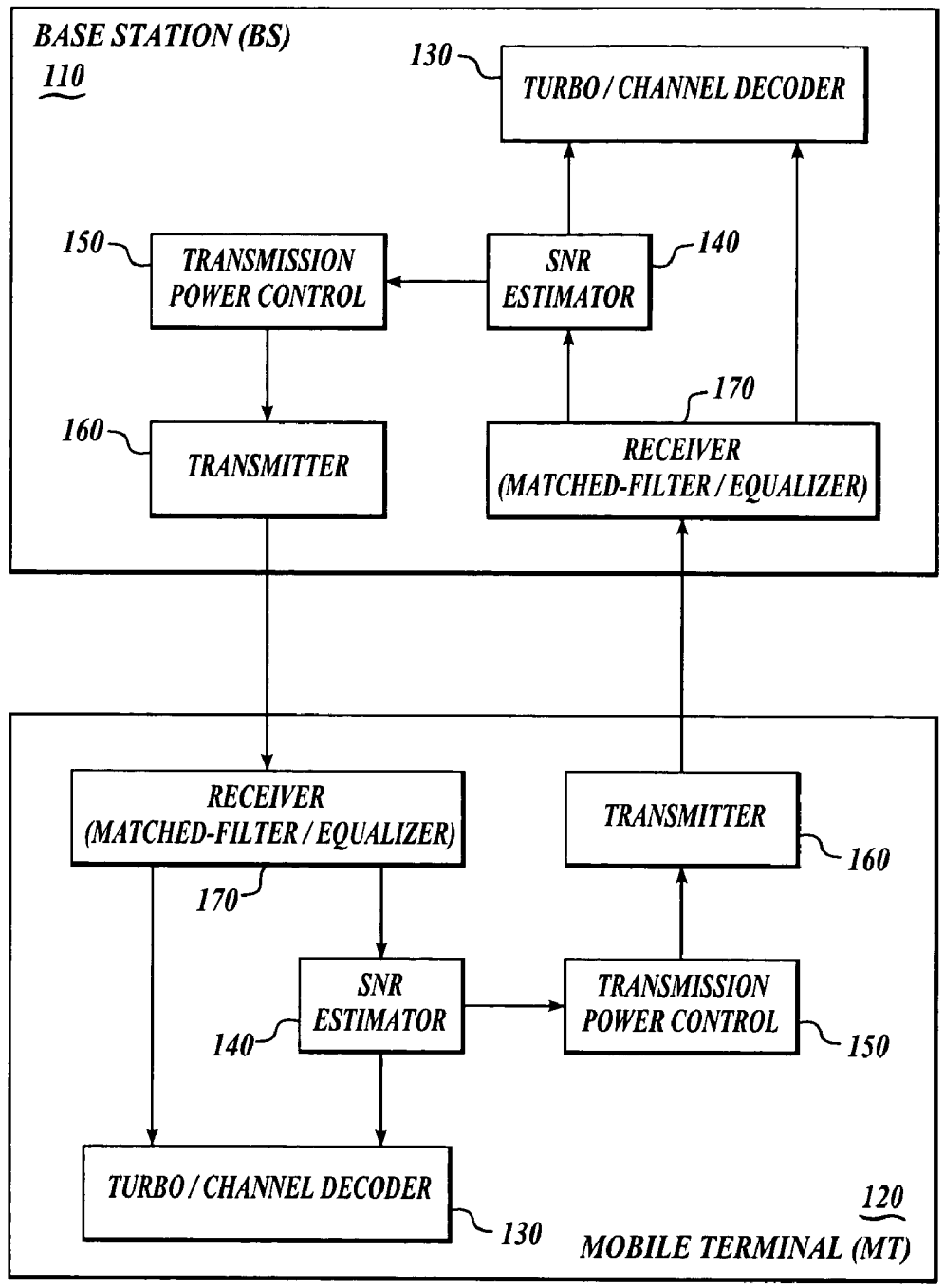
FIG. 1 is a diagram of a generalized WCDMA system comprising a Base Station and a Mobile Terminal used in accordance with the present invention.

In the following detailed description of exemplary embodiments of the invention, reference is made to the accompanied drawings, which form a part hereof, and which is shown by way of illustration, specific exemplary embodiments of which the invention may be practiced. These embodiments are described in sufficient detail to enable those skilled in the art to practice the invention, and it is to be understood that other embodiments may be utilized, and other changes may be made, without departing from the spirit or scope of the present invention. The following detailed description is, therefore, not to be taken in a limiting sense, and the scope of the present invention is defined only by the appended claims.

Throughout the specification and claims, the following terms take the meanings explicitly associated herein, unless the context clearly dictates otherwise. The meaning of "a," "an," and "the" includes plural reference, the meaning of "in" includes "in" and "on." The term "connected" means a direct electrical connection between the items connected, without any intermediate devices. The term "coupled" means either a direct electrical connection between the items connected, or an indirect connection through one or more passive or active intermediary devices. The term "circuit" means either a single component or a multiplicity of components, either active and/or passive, that are coupled together to provide a desired function. The term "signal" means at least one current, voltage, or data signal. Referring to the drawings, like numbers indicate like parts throughout the views.

The present invention is directed towards a signal-to-noise estimator for estimating the Signal-to-Noise power Ratio (SNR) of mobile wireless systems in wireless fading channels. The estimator is applied to likelihood ratio estimation of turbo decoders in Third Generation Wideband Code Division Multiple Access (WCDMA) receivers in Base Stations and Mobile Terminals. In addition, the SNR estimate is used for transmission power control in WCDMA systems. Time-multiplexed samples of pilot symbols from a wireless receiver are supplied to the estimator to obtain individual estimates of signal power and/or noise power and/or signal-to-noise power ratio. The estimator uses a de-correlating filter in which the coefficients are known functions (such as eigen-vectors) of the auto-correlation matrix for a wireless multi-path fading channel. The decorrelating filter is used by the estimator to map an observation vector (from received pilot symbols) into a set of statistically independent samples ("sufficient statistics"). The energy of each vector component is computed individually and combined (weighted sum) to produce estimates of the signal and interference power estimates. The weighting factors depend on the type of estimators, such as maximum likelihood and sub-space methods. In various embodiments, the estimator can produce joint estimations of signal and noise power in wireless channels by using properties of signal and noise sub-spaces to decouple the observation space into orthogonal domains.

FIG. 1 is a diagram of a generalized WCDMA system comprising a Base Station and a Mobile Terminal, which depicts the usage of the Signal-to-Noise Ratio Estimator in the system. System 100 comprises at least one base station (BS) 110 and at least one mobile transmitter (MT). Base station 110 comprises the RF transceivers, antennas, and other electrical equipment that are located in each cell site.

Mobile station 120 is typically a portable wireless communication device, although other configurations are possible.

BS 110 and MT 120 may transfer voice and data signals between each other and other networks such as the public switched telephone network (PSTN) (not shown), the internet, and the like. BS 110 and MT 120 comprise functional blocks that perform similar functions (although the physical implementations may vary considerably). BS 110 and MT 120 comprise Turbo/Channel Decoder 130, SNR Estimator 140, Transmission Power Control 150, Transmitter 160, and Receiver 170. As described in more detail below, SNR Estimator 140 operates in response to a signal that is received by Receiver 170 and is used to adjust the power of Transmitter 160 and to improve the performance of the channel decoder 130.

Figure 2:
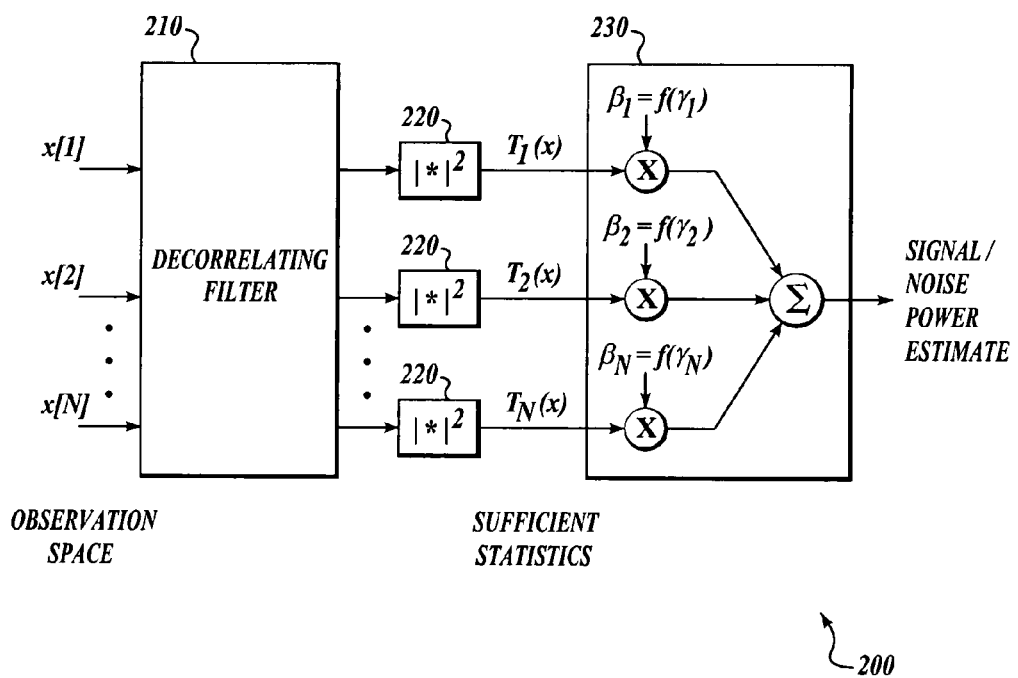
FIG. 2 is a block diagram for a signal-to-noise estimator for estimating the signal-to-noise ratio in wireless fading channels in accordance with the present invention.

FIG. 2 is a block diagram for a signal-to-noise estimator for estimating the signal-to-noise ratio in wireless fading channels in accordance with the present invention. Estimator 200 comprises decorrelating filter 210, a plurality of sufficient statistics generators 220, and weighted sum generator 203.

In general, decorrelating filter 210 receives an observation vector from N (total) received pilot symbols. (The operation of estimator 200 is generally described with respect to FIG. 2, while a more detailed description follows with respect to FIG. 3.) Decorrelating filter 210 projects the received observation vector into signal and noise subspaces. The coefficients of this filter (i.e., the projection vectors) are the N (total) eigen-vectors of the fading channel autocorrelation matrix. The plurality of sufficient statistics generators (120) produces a set of N (total) sufficient statistics, which are produced according to the square-magnitude of the outputs of decorrelating filter 210. Weighted sum generator 230 receives the generated sufficient statistics and generates signal and/or noise ("signal/noise") power estimates in response. Specific sets (in accordance with various estimation algorithms) of weighting coefficients can be used to weight each of the generated N sufficient statistics for producing the signal/noise power estimate.

Figure 3:
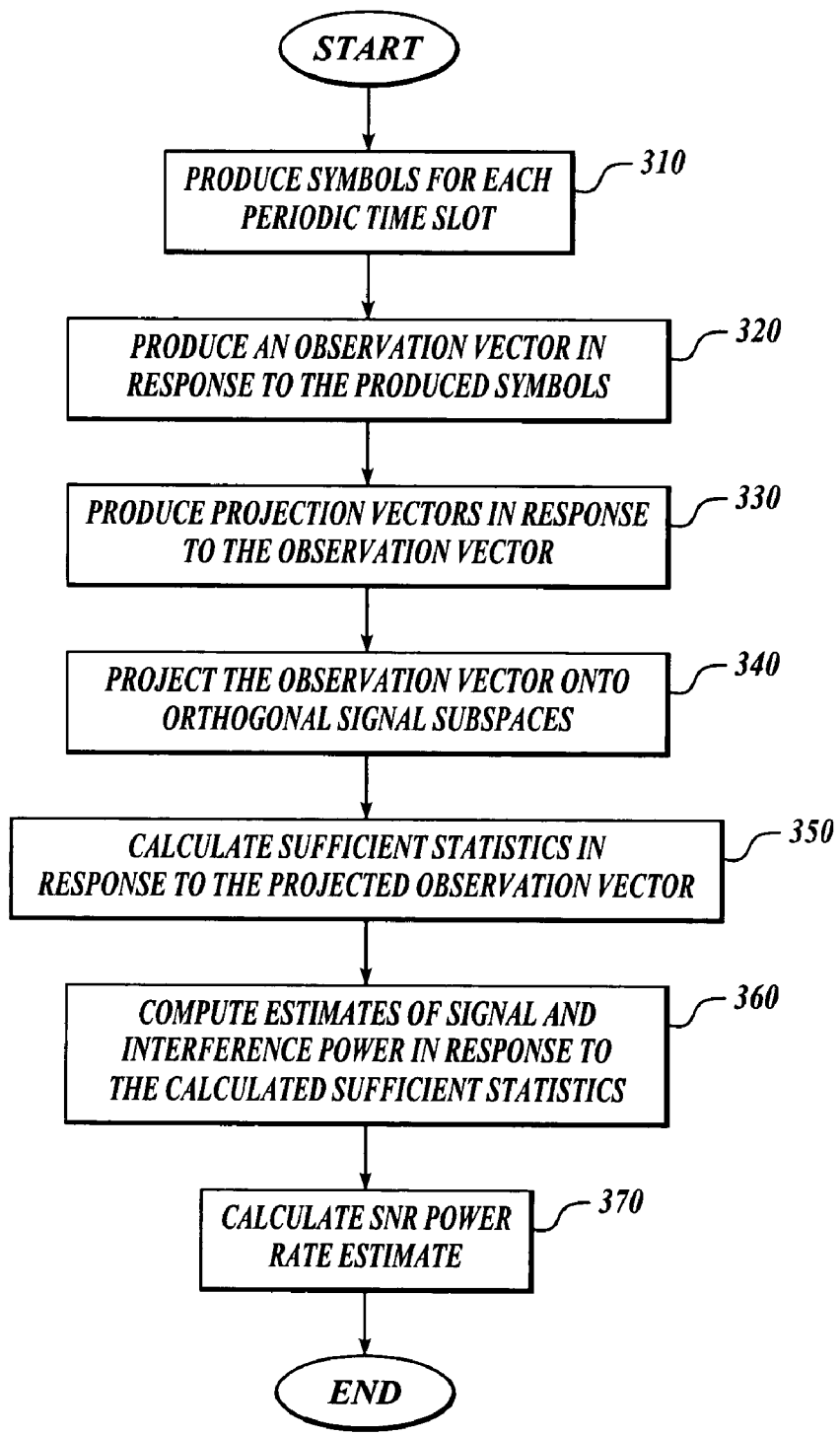
FIG. 3 is a flow diagram for estimating the signal-to-noise ratio in wireless fading channels in accordance with the present invention.

FIG. 3 is a flow diagram for estimating the signal-to-noise ratio in wireless fading channels in accordance with the present invention. In block 310, a matched filter receiver or equalizer (such as from a "finger" of a rake receiver) produces outputs for each periodic timeslot ("slot"). Each slot is typically 10–15 milliseconds, although other durations are possible. The outputs are de-multiplexed into data symbols, control symbols, and pilot symbols.

In block 320, a number of pilot symbols (in which P is the number of pilot symbols) are de-rotated by the known phase of the transmitted symbols. The de-rotated P pilot symbols obtained from a number of successive slots (in which L is the number of successive slots) are assembled in an "observation vector." The observation vector is an array of length N, wherein N=LXP with L being the number of time-slots used for estimation and. P being the number of pilots per time-slot. The observation vector may be expressed as:

X=[x[1]], [x[1]], . . . [x[N]]

In block 330, a "projection vector" is obtained for projection of the observation vector onto orthogonal signal subspaces. The projection vector is an array, which is also (typically) of length N. The N projection vectors may be expressed as:

$u_j = 1, \ldots, N$ where the N projection vectors are projected onto N orthogonal signal subspaces.

In various embodiments of the invention, the projection vectors (which are used as coefficients of the de-correlating filter) are the N eigen-vectors associated with the auto-correlation matrix of the fading channel. The auto-correlation matrix can be assumed to be known beforehand for any given Doppler frequency. The Doppler frequency of a mobile transmitted signal is directly proportional to the speed of the mobile and typically introduces phase distortion into the transmitted signal.

Calculating the N projection vectors in real time is computationally intensive. The projection vectors can be obtained by various methods by which the computational load can be reduced and power can be conserved. For example, the projection vectors can be pre-calculated for different Doppler frequencies, or for example, obtained by nonlinear interpolation from an estimate of the Doppler frequency.

In the example where the projection vectors are pre-calculated, a lookup table of pre-calculated sets of coefficients (i.e., projection vectors) for different Doppler frequencies can be stored in the memory of the mobile. A set of coefficients can be selected from the table based on a real-time coarse estimate of the Doppler frequency. The coarse estimate can, for example, be divided into low Doppler (around 5 Hz), medium Doppler (around 50 Hz), or High Doppler (around 500 Hz). For cases where a Doppler estimate may be unavailable or unreliable, a fixed set of coefficients can be used regardless of the speed of the mobile. The coefficients are selected such that a relatively good performance is achieved over the entire range of mobile speed.

In the example where the projection vectors are obtained by nonlinear interpolation, the N projection vectors can be calculated by interpolation for one or more pre-calculated set(s) of coefficients (projection vectors) for particular Doppler frequencies. The particular Doppler frequencies are chosen such that adequate coefficients can be derived using the particular Doppler frequencies.

The interpolation equation can be expressed as:

$$u_i(f_1) = \sum_{j=1}^{N} u_j(f_0) e^{\xi_{ij}} f_1^{\theta_{ij}},$$

where the projection vectors at an arbitrary frequency $f_1$ are obtained from $u_i(f_0)$, in which i=1, . . . N, and in which exponents $\xi_{ij}$ and $\theta_{ij}$ are pre-calculated and stored off-line. The pre-calculated vectors are calculated for frequency $f_0$, which is typically a low frequency such as 0 Hz. The interpolation coefficients, $\theta_{ij}$ and $\xi_{ij}$ are obtained by an interpolation algorithm such as a least-squares estimation technique.

In block 340, a de-correlating filter projects the obtained observation vector onto the j-th signal subspace according to the following equation for j=1, . . . , N:

$$\tilde{x}_j = \sum_{k=1}^{N} Re(x_j[k])Re(u_j[k]) + Im(x_j[k])Im(u_j[k])$$

In block 350, sufficient statistics $T_j$, for j=1, . . . , N are calculated. The sufficient statistics are calculated by computing energy of the observation vector in each signal subspace as:

$T_j = Re(\tilde{x}_j)^2 + Im(\tilde{x}_j)^2$

In block 360, estimates of signal ($\rho$) and interference ($\sigma^2$) power are computed. The estimates can be computed by forming a weighted sum of the sufficient statistics $T_j$ as in the following equations $$\hat{\rho} = \sum_{j=1}^{N} \zeta_j T_j$$

and $$\hat{\sigma}^2 = \sum_{j=1}^{N} \beta_j T_j$$

where ζ and β are weight coefficients given by, for example, maximum-likelihood and subspace estimators. In the following equations for the maximum-likelihood and subspace estimators, $N_s$ is the size of signal subspace and $\gamma_i$'s are the eigen-values (singular values) of the fading channel auto-correlation matrix (which may be calculated off-line or in real-time).

The weight coefficients obtained from a maximum-likelihood estimator can be produced according to the following equations. The signal coefficients of the maximum-likelihood estimator can be produced according to $$\varsigma_j = \frac{\gamma_j - 1}{N*(\mu - 1)}$$

and the noise coefficients of the maximum-likelihood estimator can be produced according to $$\beta_j = \frac{\mu - \gamma_j}{N(\mu - 1)}$$

where $$\mu = \frac{1}{N}\sum_{i=1}^{N}\gamma_j^2$$

The weight coefficients obtained from a sub-space estimator can be produced according to the following equations. The signal coefficients of the maximum-likelihood estimator can be produced according to $$\varsigma_j = \begin{cases} \frac{1}{N} & 1 \le j \le N_s \\ \frac{-N_s}{(N-N_s)*N} & j > N_s \end{cases}$$

The noise coefficients of the sub-space estimator can be produced according to $$\beta_j = \begin{cases} 0 & 1 \le j \le N_s \\ \frac{-1}{(N-N_s)} & j > N_s \end{cases}$$

In block 370, the signal-to-noise power ratio estimate is then calculated by dividing the signal power estimate derived in block 360 by the noise power estimate computed in block 360.

Various embodiments of the invention are possible without departing from the spirit and scope of the invention. For example, weighting coefficients that are used to produce the signal/noise estimate may be produced by methods other than maximum-likelihood or subspace estimations. The above specification, examples and data provide a complete description of the manufacture and use of the composition of the invention. Since many embodiments of the invention can be made without departing from the spirit and scope of the invention, the invention resides in the claims hereinafter appended.

We claim:

1. An estimation circuit for estimating the signal-to-noise ratio in a signal, comprising:
   a decorrelating filter that is configured to receive an observation vector and project the received observation vector into signal/noise subspaces;
   a plurality of sufficient statistics generators that are configured to map the projected observation vector into a set of sufficient statistics; and
   a weighted sum generator that is configured to compute the energy of each vector component from the set of sufficient statistics and to produce an aggregate sum for the vector in response to the computed energies of each vector component.

2. The circuit of claim 1, wherein the weighted sum generator computes the energy of each vector component according to a maximum-likelihood estimation.

3. The circuit of claim 1, wherein the weighted sum generator computes the energy of each vector component according to a sub-space estimation.

4. The circuit of claim 1, wherein the weighted sum generator is further configured to apply the aggregate sum to likelihood ratio estimation of turbo decoders.

5. The circuit of claim 1, wherein the decorrelating filter comprises coefficients that are eigen-vectors that are associated with the autocorrelation matrix for a wireless channel.

6. The circuit of claim 1, wherein the decorrelating filter is further configured to project the observation vector using nonlinear interpolation.

7. The circuit of claim 1, wherein the weighted sum generator is further configured to subtract the aggregate sum from the pilot tone power in order to produce an estimate of noise power.

8. A method for estimating the signal-to-noise ratio in a signal, comprising:
   receiving an observation vector and projecting the received observation vector into signal/noise subspaces;
   mapping the projected observation vector into a set of sufficient statistics;
   computing the energy of each vector component from the set of sufficient statistics; and
   producing an aggregate sum for the vector in response to the computed energies of each vector component.

9. The method of claim 8, wherein the energy of each vector component is computed according to a maximum-likelihood estimation.

10. The method of claim 8, wherein the energy of each vector component is computed according to a sub-space estimation.

11. The method of claim 8, further comprising applying the aggregate sum to likelihood ratio estimation used in turbo decoders.

12. The method of claim 8, wherein the observation vector is projected using coefficients that are eigen-vectors of the autocorrelation matrix for a wireless channel.

13. The method of claim 8, wherein the observation vector is projected using nonlinear interpolation.

14. The method of claim 8, wherein the aggregate sum is subtracted from the pilot tone power in order to produce an estimate of noise power.

15. A circuit for estimating the signal-to-noise ratio in a signal, comprising:

means for receiving an observation vector and projecting the received observation vector into signal/noise subspaces;

means for mapping the projected observation vector into a set of sufficient statistics;

means for computing the energy of each vector component from the set of sufficient statistics; and means for producing an aggregate sum for the vector in response to the computed energies of each vector component.

16. The circuit of claim 15, wherein the means for computing the energy of each vector component is configured to compute the energy according to a maximum-likelihood estimation.

17. The circuit of claim 15, wherein the means for computing the energy of each vector component is configured to compute the energy according to a sub-space estimation.

18. The circuit of claim 15, further comprising wherein the means for applying the aggregate sum to likelihood ratio estimation used in turbo decoders.

19. The circuit of claim 15, wherein the means for projecting the observation vector is configured to projected the observation vector using coefficients that are eigenvectors of the autocorrelation matrix for a wireless channel.

20. The circuit of claim 15, wherein the means for projecting the observation vector is configured to projected the observation vector using nonlinear interpolation.

* * * * *

UNITED STATES PATENT AND TRADEMARK OFFICE
CERTIFICATE OF CORRECTION

PATENT NO. : 7,006,800 B1
APPLICATION NO. : 10/457057
DATED : February 28, 2006
INVENTOR(S) : Lashkarian et al.

It is certified that error appears in the above-identified patent and that said Letters Patent is hereby corrected as shown below:

Column 3, Line 33: "wherein N=LXP" should read --wherein N=LxP--

Column 3, Line 34: "estimation and." should read --estimation and,--

Column 3, Line 37: "X=[x[1]], [x[1]]" should read --X=[x[1]], [x[2]]--

Column 4, Line 23: --i=1,...,N-- is missing from the patent.

Column 4, Line 28: "which i=1,...N," should read --which i=1,...,N,--

Signed and Sealed this

Thirtieth Day of September, 2008

JON W. DUDAS
*Director of the United States Patent and Trademark Office*